US012078965B2

(12) United States Patent
Sawada et al.

(10) Patent No.: US 12,078,965 B2
(45) Date of Patent: Sep. 3, 2024

(54) BALANCE WITH HAIRSPRING, MOVEMENT, MECHANICAL WATCH, AND METHOD FOR MANUFACTURING BALANCE WITH HAIRSPRING

(71) Applicant: Seiko Epson Corporation, Tokyo (JP)

(72) Inventors: Akihiro Sawada, Matsumoto (JP); Yosuke Sasaki, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 447 days.

(21) Appl. No.: 17/454,679

(22) Filed: Nov. 12, 2021

(65) Prior Publication Data

US 2022/0155727 A1 May 19, 2022

(30) Foreign Application Priority Data

Nov. 13, 2020 (JP) ................................ 2020-189610

(51) Int. Cl.
*G04B 17/06* (2006.01)

(52) U.S. Cl.
CPC ......... *G04B 17/063* (2013.01); *G04B 17/066* (2013.01)

(58) Field of Classification Search
None
See application file for complete search history.

(56) References Cited

U.S. PATENT DOCUMENTS 10,444,706 B2 10/2019 Conus et al.
2015/0248113 A1 * 9/2015 Bucaille ................ G04B 17/26 368/175

FOREIGN PATENT DOCUMENTS

JP 2013-015534 A 1/2013

* cited by examiner

*Primary Examiner* — Renee S Luebke
*Assistant Examiner* — Matthew Hwang
(74) *Attorney, Agent, or Firm* — Harness, Dickey & Pierce, P.L.C.

(57) ABSTRACT

A balance with hairspring of the present disclosure includes a balance shaft rotatably supported by a support member, a collet fixed to the balance shaft, and a metal hairspring fixed to the collet, and the hairspring includes an inner end portion fixed to the collet, a first winding portion continuously formed from the inner end portion and formed along a Grossmann curve, and a second winding portion continuously formed from the first winding portion and formed along an Archimedes' spiral, and the collet includes a fixing portion to which the inner end portion of the hairspring is fixed, and an outer peripheral shape portion arranged at a position facing an inner surface of the first winding portion and configured to form the first winding portion into a shape of the Grossmann curve.

7 Claims, 11 Drawing Sheets

BALANCE WITH HAIRSPRING, MOVEMENT, MECHANICAL WATCH, AND METHOD FOR MANUFACTURING BALANCE WITH HAIRSPRING

The present application is based on, and claims priority from JP Application Serial Number 2020-189610, filed Nov. 13, 2020, the disclosure of which is hereby incorporated by reference herein in its entirety.

BACKGROUND

1. Technical Field

The present disclosure relates to a balance with hairspring, a movement, a mechanical watch, and a method for manufacturing the balance with hairspring.

2. Related Art

JP-A-2013-15534 discloses that an amorphous material or a crystalline material for a silicon wafer or the like is micromachined to manufacture a hairspring for a regulator of a mechanical watch.

In JP-A-2013-15534, this method makes it possible to form the hairspring into a Grossmann curve, thereby improving isochronism.

However, in JP-A-2013-15534, in order to manufacture a metal hairspring, it is necessary to apply LIGA technology to form a mold corresponding to a desired profile of the hair spring. Therefore, in JP-A-2013-15534, there is a problem in that the metal hairspring cannot be easily manufactured.

SUMMARY

A balance with hairspring of the present disclosure includes a balance shaft rotatably supported by a support member, a collet fixed to the balance shaft, and a metal hairspring fixed to the collet, and the hairspring includes an inner end portion fixed to the collet, a first winding portion continuously formed from the inner end portion and formed along a Grossmann curve, and a second winding portion continuously formed from the first winding portion and formed along an Archimedes' spiral, and the collet includes a fixing portion to which the inner end portion of the hairspring is fixed, and an outer peripheral shape portion arranged at a position facing an inner surface of the first winding portion and configured to form the first winding portion into a shape of the Grossmann curve.

A movement of the present disclosure includes the balance with hairspring.

A mechanical watch of the present disclosure includes the movement.

A method for manufacturing a balance with hairspring of the present disclosure is a method for manufacturing the balance with hairspring including a balance shaft rotatably supported by a support member, a collet fixed to the balance shaft, and a metal hairspring having an inner end portion fixed to the collet, and the method includes forming the hairspring along an Archimedes' spiral, fixing the inner end portion of the hairspring to the collet, and forming a section from the inner end portion to a predetermined position of the hairspring into a shape of a Grossmann curve using the outer peripheral shape portion of the collet.

DESCRIPTION OF EXEMPLARY EMBODIMENTS

Embodiments

A mechanical watch 1 according to an exemplary embodiment of the present disclosure will be described below with reference to the drawings.

Figure 1:
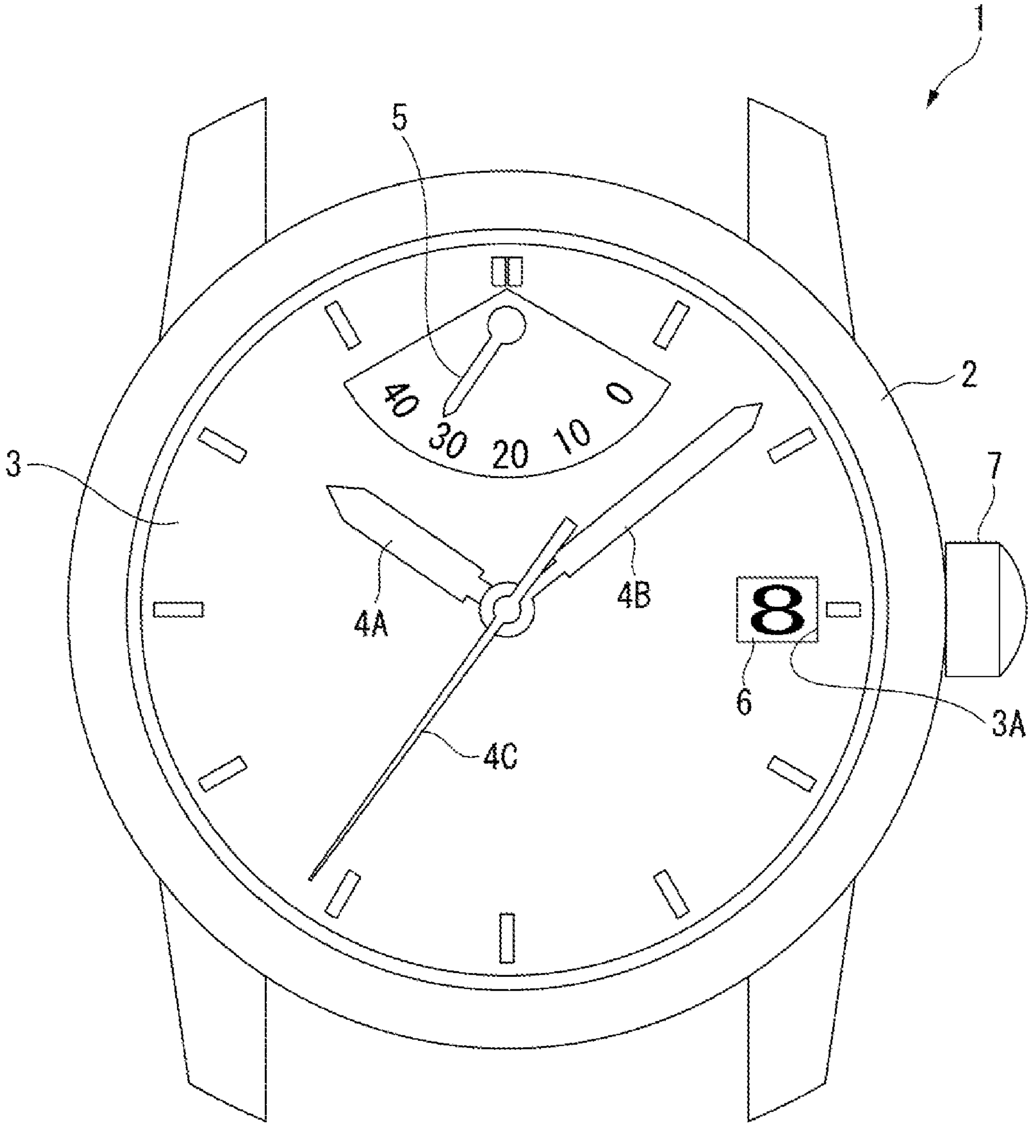
FIG. 1 is a front view illustrating a mechanical watch according to an exemplary embodiment.
Figure 2:
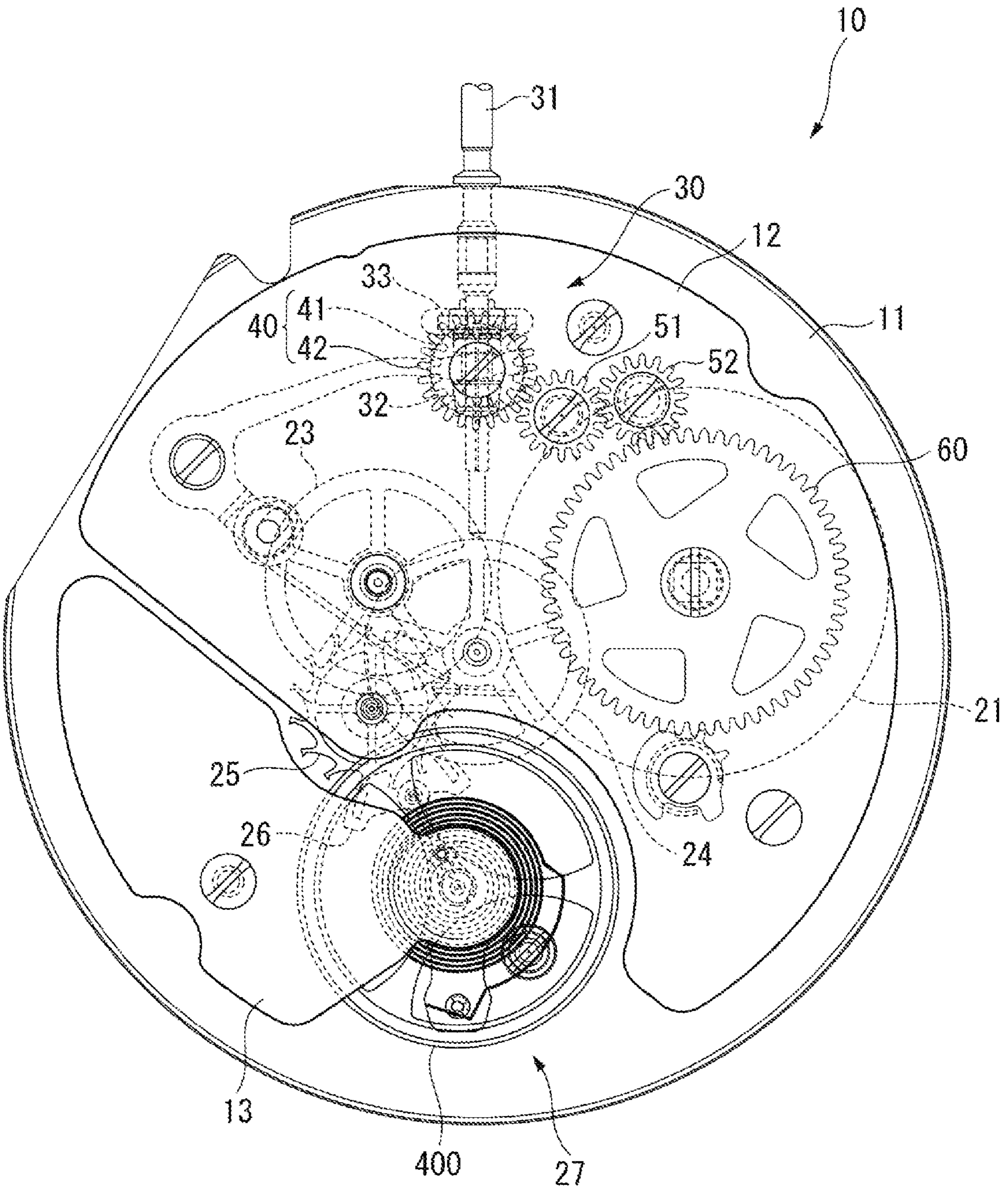
FIG. 2 is a front view illustrating a movement according to the exemplary embodiment.

FIG. 1 is a front view of the mechanical watch 1, and FIG. 2 is a front view illustrating a movement 10.

As illustrated in FIGS. 1 and 2, the mechanical watch 1 is a wristwatch worn on a wrist of a user and includes a cylindrical outer case 2. Then, a dial 3 is arranged on an inner peripheral side of the outer case 2. Of two openings of the outer case 2, an opening on a front surface side is closed by a cover glass, and another opening on a back surface side is closed by a case back.

The mechanical watch 1 also includes the movement 10 accommodated in the outer case 2, and an hour hand 4A, a minute hand 4B, a seconds hand 4C for displaying time information, and a power reserve hand 5 for indicating a duration of power stored in a mainspring (not illustrated) included in the movement 10.

The hour hand 4A, the minute hand 4B, the seconds hand 4C, and the power reserve hand 5 are attached to a hand shaft of the movement 10 and driven by the movement 10.

The dial 3 has a calendar small window 3A, and a date indicator 6 is visible through the calendar small window 3A.

A crown 7 is provided on a side surface of the outer case 2. The crown 7 can be pulled two steps from a zero step position in which the crown 7 is pushed toward the center of the mechanical watch 1.

When the crown 7 is rotated at the zero step position, the mainspring can be wound up as described later. The power reserve hand 5 turns in conjunction with the winding of the mainspring. The mechanical watch 1 of the exemplary embodiment can ensure a duration of approximately 40 hours when the mainspring is fully wound. When the crown 7 is pulled to the first step position and rotated, the date can be adjusted by moving the date indicator 6. When the crown 7 is pulled to the second step position, the seconds hand 4C stops. When the crown 7 is rotated at the second step position, the time can be adjusted by moving the hour hand 4A and the minute hand 4B.

Movement

The movement 10 includes a main plate 11, a barrel and train wheel bridge 12, and a balance bridge 13. A movement barrel complete 21 in which the mainspring is stored, a center wheel and pinion (not illustrated), a third wheel and pinion 23, a seconds wheel and pinion 24, and an escape wheel and pinion 25 are arranged between the main plate 11 and the barrel and train wheel bridge 12. Further, a pallet fork 26, a regulator 27, and the like are arranged between the main plate 11 and the balance bridge 13. Then, in the exemplary embodiment, the regulator 27 includes a balance with hairspring 400.

Manual Winding Mechanism

A manual winding mechanism 30 includes a winding stem 31, a clutch wheel 32, a winding pinion 33, a crown wheel 40, a first intermediate wheel 51, and a second intermediate wheel 52, which are rotatably supported by the barrel and train wheel bridge 12. The manual winding mechanism 30 transmits the rotation of the crown 7 by the rotation operation to a ratchet wheel 60, and rotates the ratchet wheel 60 and the barrel arbor to wind the mainspring. Note that the crown wheel 40 is composed of a first crown wheel 41 that meshes with the winding pinion 33 and a second crown wheel 42 that rotates together with the first crown wheel 41 and meshes with the first intermediate wheel 51.

Balance with Hairspring

Figure 3:
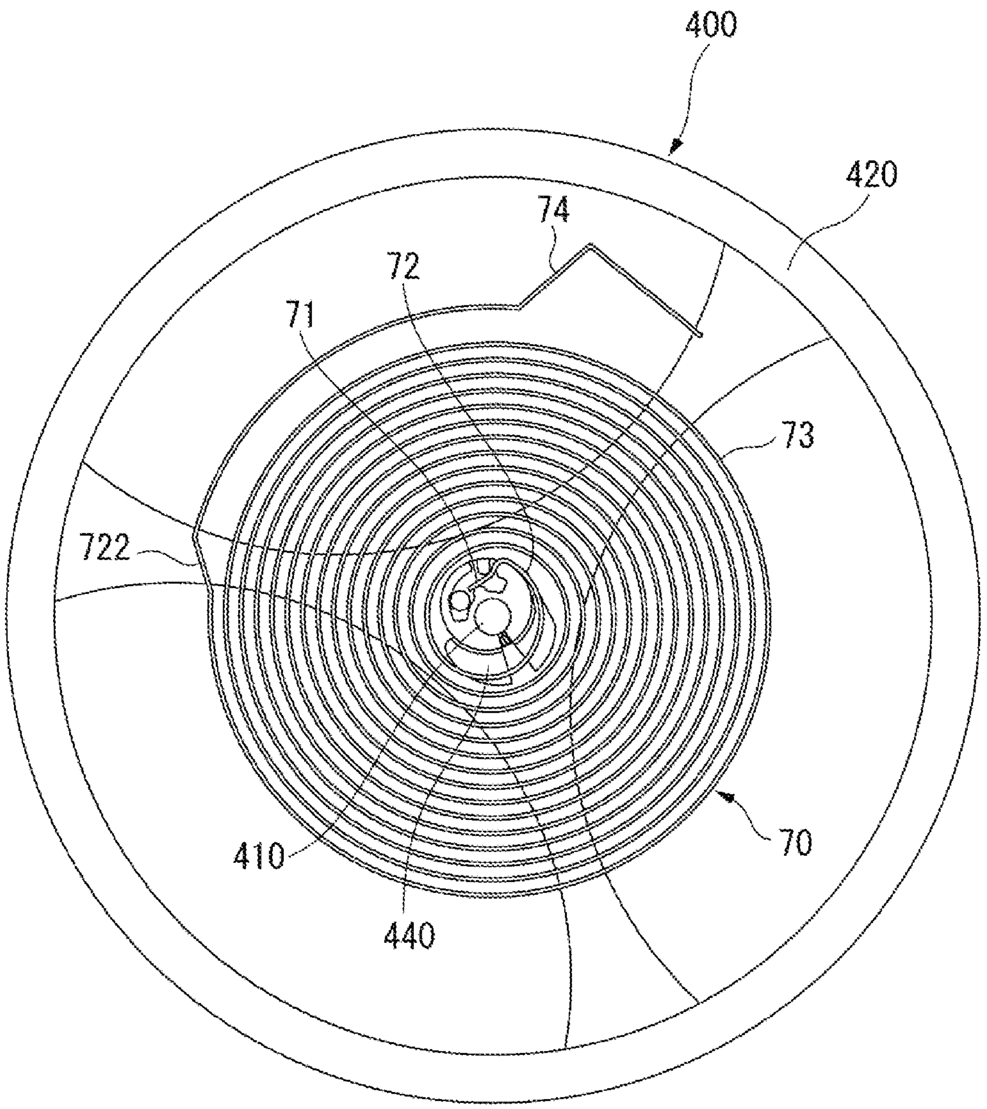
FIG. 3 is a front view illustrating a balance with hairspring according to the exemplary embodiment.

FIG. 3 is a front view illustrating the balance with hairspring 400.

As illustrated in FIG. 3, the balance with hairspring 400 is configured with a balance shaft 410, a balance wheel 420, a collet 440, and a hairspring 70.

The balance shaft 410 is rotatably supported by the main plate 11 and the balance bridge 13. Note that the main plate 11 and the balance bridge 13 are examples of support members of the present disclosure.

The balance wheel 420, the collet 440, and the like are fixed to the balance shaft 410, and these are configured to rotate together. An inner end portion 71 of the hairspring 70 is fixed to the collet 440, and an outer end portion 74 of the hairspring 70 is fixed to a stud (not illustrated). The stud is fixed to the balance bridge 13.

Then, in such a balance with hairspring 400, when the balance wheel 420 rotates about the balance shaft 410, the collet 440 also rotates accordingly, so that the biasing force of the hairspring 70 acts on the balance wheel 420. When this biasing force and the inertial force of the balance wheel 420 are balanced, a rotation of the balance wheel 420 is stopped, and the biasing force of the hairspring 70 causes the balance wheel 420 to rotate in a reverse direction. In other words, the balance wheel 420 repeats the swinging about the balance shaft 410.

Hairspring

Figure 4:
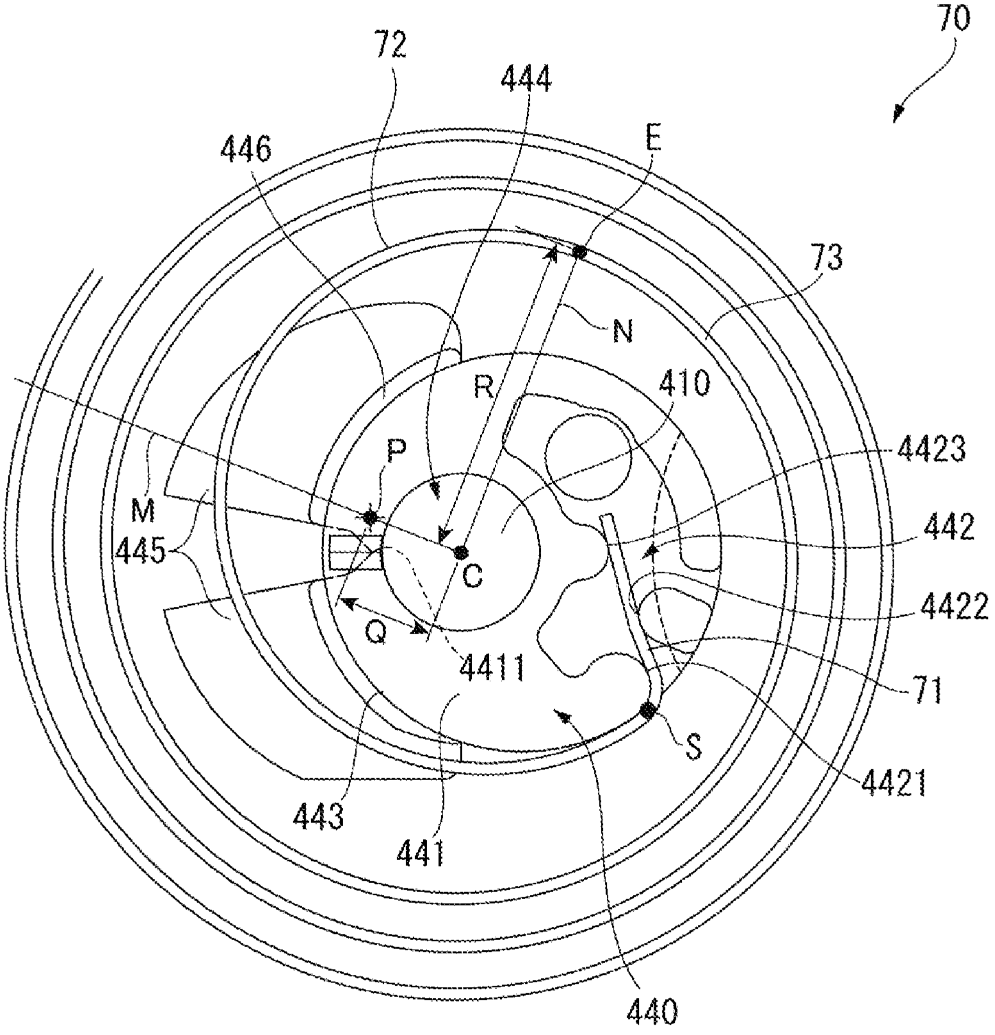
FIG. 4 is an enlarged front view of part of FIG. 3.

FIG. 4 is an enlarged plan view of part of FIG. 3.

As illustrated in FIGS. 3 and 4, the hairspring 70 is formed of a metal plate-shaped elastic material, specifically, a plate-shaped elastic material such as co-elinvar, which is an alloy containing Cr, Ni, Co, and the like.

In the exemplary embodiment, the hairspring 70 includes the inner end portion 71, a first winding portion 72, a second winding portion 73, and the outer end portion 74.

The inner end portion 71 is a portion that is inserted into and fixed by a fixing portion 442 of the collet 440, which will be described later.

The first winding portion 72 is formed continuously from the inner end portion 71. In the exemplary embodiment, the first winding portion 72 is formed along a Grossmann curve in plan view seen from an axial direction of the balance shaft 410.

Specifically, in FIG. 4, the first winding portion 72 is formed so that the center of gravity coincides with a virtual point P on a virtual line segment M orthogonal to a virtual line segment N that connects a connection point E of the first winding portion 72 and the second winding portion 73 and a center point C of the balance shaft 410, and at a position where a length Q from the center point C of the balance shaft 410 satisfies the following equation (1).

[Mathematical Equation 1]

$$Q = \frac{R^2}{L} \qquad \text{Equation (1)}$$

In the above equation (1), R is a length of the virtual line segment N from the center point C of the balance shaft 410 to the connection point E of the first winding portion 72 and the second winding portion 73. In addition, L is a length of an arc from a connection point S of the inner end portion 71 and the first winding portion 72 to the connection point E of the first winding portion 72 and the second winding portion 73, that is, a length of the first winding portion 72.

Here, in the exemplary embodiment, the first winding portion 72 is configured such that the length L is slightly shorter than a length of an outer peripheral shape portion 443, which will be described later.

The second winding portion 73 is formed continuously from the first winding portion 72. In the exemplary embodiment, the second winding portion 73 is formed along an Archimedes' spiral in plan view seen from the axial direction of the balance shaft 410. In addition, in the exemplary embodiment, a bent portion 722 is formed in the middle of the outermost periphery of the second winding portion 73.

The outer end portion 74 is continuously formed from the second winding portion 73, and is fixed to the stud (not illustrated). That is, the inner end portion 71 of the hairspring 70 is fixed to the collet 440, and the outer end portion 74 of the hairspring 70 is fixed to the stud (not illustrated).

Collet

Figure 5:
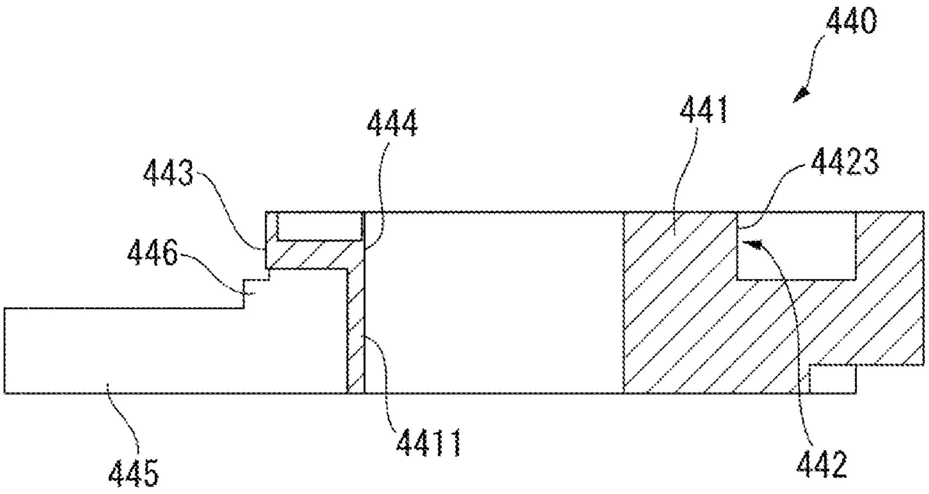
FIG. 5 is a cross-sectional view illustrating a collet according to the exemplary embodiment.
Figure 6:
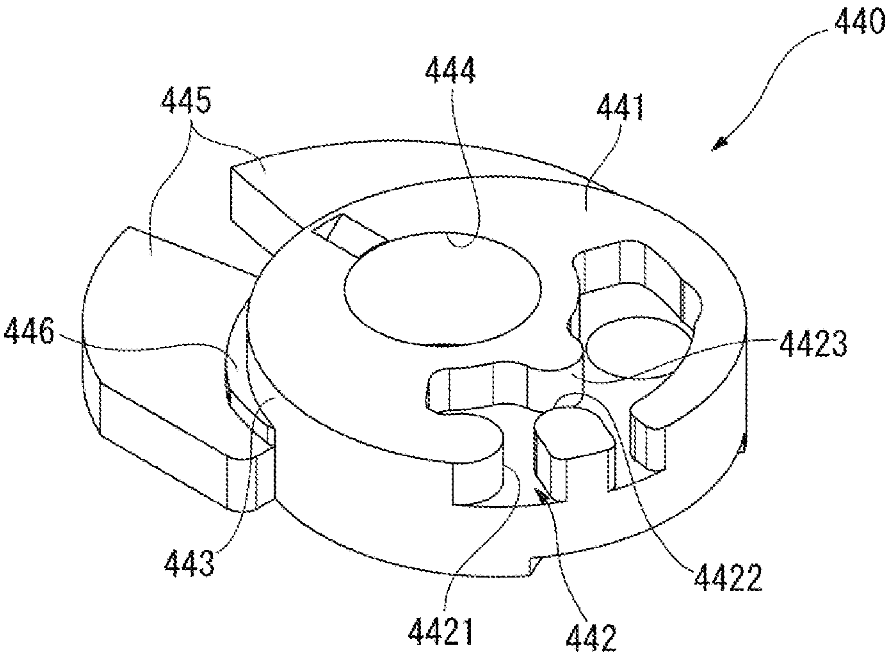
FIG. 6 is a perspective view illustrating the collet according to the exemplary embodiment.

FIG. 5 is a cross-sectional view illustrating the collet 440, and FIG. 6 is a perspective view illustrating the collet 440.

As illustrated in FIGS. 3 to 6, the collet 440 is fixed to the balance shaft 410. In the exemplary embodiment, the collet 440 is provided with a collet main body 441, the fixing portion 442, the outer peripheral shape portion 443, a balance shaft insertion hole 444, a center of gravity adjustment portion 445, and a support portion 446.

The collet main body 441 is formed in a substantially cylindrical shape. An outer peripheral surface of the collet main body 441 is the outer peripheral shape portion 443. Additionally, the balance shaft insertion hole 444 is formed in the collet main body 441 at a position eccentric from a center position of the collet main body 441 in plan view seen from the axial direction of the balance shaft 410.

Furthermore, in the exemplary embodiment, a thin wall portion 4411 having a thinned thickness is formed in the collet main body 441. With this configuration, when the balance shaft 410 is inserted into the balance shaft insertion hole 444, in a case in which the torque when the collet 440 is fixed to the balance shaft 410 is too strong, the torque can be adjusted to an appropriate value by cracking the thin wall portion 4411. Therefore, in order to adjust the rotational phase with an impulse pin (not illustrated), the torque when rotating the collet 440 with respect to the balance shaft 410 can be stabilized. Note that in a case in which the torque when the balance shaft 410 is inserted into the balance shaft insertion hole 444 is appropriate, the thin wall portion 4411 is configured so as not to crack.

The fixing portion 442 is a portion for fixing the inner end portion 71 of the hairspring 70. In the exemplary embodiment, the fixing portion 442 includes a first contact portion 4421, a second contact portion 4422, and a third contact portion 4423.

The first contact portion 4421 is in contact with one surface of the inner end portion 71 at a position of the inner end portion 71 on the first winding portion 72 side. In addition, the second contact portion 4422 is in contact with another surface of the inner end portion 71 at and near the central portion of the inner end portion 71. Then, the third contact portion 4423 is in contact with the one surface of the inner end portion 71 at a position of the inner end portion 71 on the inner end side. In other words, in the exemplary embodiment, in the fixing portion 442, the first contact portion 4421 and the third contact portion 4423 are in contact with the one surface of the inner end portion 71, and the second contact portion 4422 is in contact with the other surface of the inner end portion 71. As a result, the inner end portion 71 is fixed by sandwiching the inner end portion 71 between the first contact portion 4421, the second contact portion 4422, and the third contact portion 4423.

As described above, the outer peripheral shape portion 443 is configured as the outer peripheral surface of the collet main body 441 having the cylindrical shape. In other words, the outer peripheral shape portion 443 has an arc shape in plan view seen from the axial direction of the balance shaft 410. Then, in the exemplary embodiment, the outer peripheral shape portion 443 is arranged at a position facing an inner surface of the first winding portion 72, and is configured as a shape for forming the first winding portion 72 into a shape of the Grossmann curve described above. Note that a method for forming the first winding portion 72 into the Grossmann curve using the outer peripheral shape portion 443 will be described later.

The balance shaft insertion hole 444 is an insertion hole into which the balance shaft 410 is inserted. In the exemplary embodiment, as described above, the balance shaft insertion hole 444 is formed in the collet main body 441 at the position eccentric from the center position of the collet main body 441.

The center of gravity adjustment portion 445 is a member for adjusting the center of gravity of the collet 440.

Here, as described above, since the balance shaft insertion hole 444 is formed at a position eccentric from the center position of the collet main body 441, the center of gravity of the collet main body 441 deviates from the center point C of the balance shaft 410. Therefore, when the collet main body 441 is rotated with the balance shaft 410 as the rotation axis, the collet main body 441 will rotate in a state that the center of gravity deviates from the center of rotation.

Thus, in the exemplary embodiment, the center of gravity adjustment portion 445 is integrally formed with the collet main body 441. Specifically, the center of gravity adjustment portion 445 is formed so that the center of gravity of the collet 440 coincides with the center point C of the balance shaft 410. With this configuration, when the collet 440 is rotated about the balance shaft 410 as the rotational center, it is possible to prevent the center of gravity of the collet 440 from deviating from the center point C of the balance shaft 410.

Note that, in the exemplary embodiment, the center of gravity adjustment portion 445 is formed at two positions with the thin wall portion 4411 of the collet main body 441 sandwiched in plan view seen from the axial direction of the balance shaft 410.

Here, in the exemplary embodiment, in a side view seen from a direction orthogonal to the axial direction of the balance shaft 410, the center of gravity adjustment portion 445 is formed at a position shifted from the fixing portion 442 to the axial direction of the balance shaft 410, that is, the thickness direction of the collet main body 441. With this configuration, when the inner end portion 71 of the hairspring 70 is fixed to the fixing portion 442, the hairspring 70 and the center of gravity adjustment portion 445 are arranged at positions shifted from each other to the thickness direction of the collet main body 441. Therefore, it is possible to prevent the center of gravity adjustment portion 445 from interfering with the hairspring 70.

The support portion 446 is formed integrally with the collet main body 441, and is a portion that supports the hairspring 70 when the first winding portion 72 is formed along the Grossmann curve. Details of the support of the hairspring 70 by the support portion 446 will be described later.

Method for Manufacturing Hairspring

Next, a method for manufacturing the hairspring 70 will be described.

FIGS. 7 to 11 are views illustrating the method for manufacturing the hairspring 70.

Figure 7:
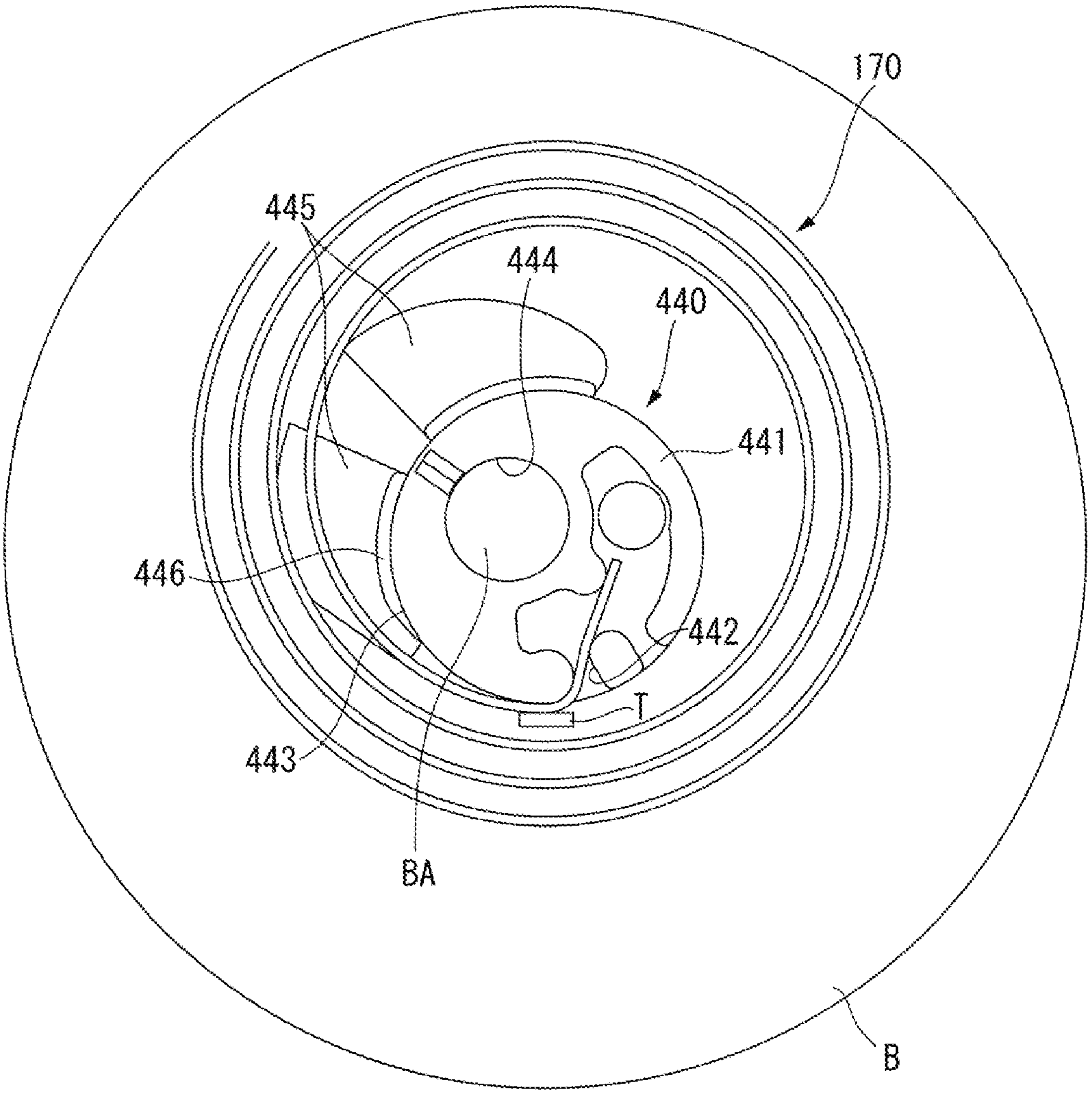
FIG. 7 is a front view illustrating a method for manufacturing a hairspring.

First, as illustrated in FIG. 7, a hairspring material 170 formed of a metal plate-shaped elastic material is formed along the Archimedes' spiral. Then, the inner end portion of the hairspring material 170 is fixed to the collet 440. At this time, the hairspring material 170 may be bent in advance at and near a position corresponding to the connection point S illustrated in FIG. 4, and then the inner end portion of the hairspring material 170 may be fixed to the fixing portion 442 of the collet 440.

Subsequently, the collet 440 to which the hairspring material 170 is fixed is attached to a turntable B provided with a shape forming unitT. At this time, a protrusion portion BA of the turntable B is inserted into the balance shaft insertion hole 444 of the collet 440 in a state in which a portion connected to the inner end portion of the hairspring material 170 fixed to the fixing portion 442, that is, a portion protruding from the fixing portion 442 of the hairspring material 170, is sandwiched between the outer peripheral shape portion 443 and the shape forming unit T.

Figure 8:
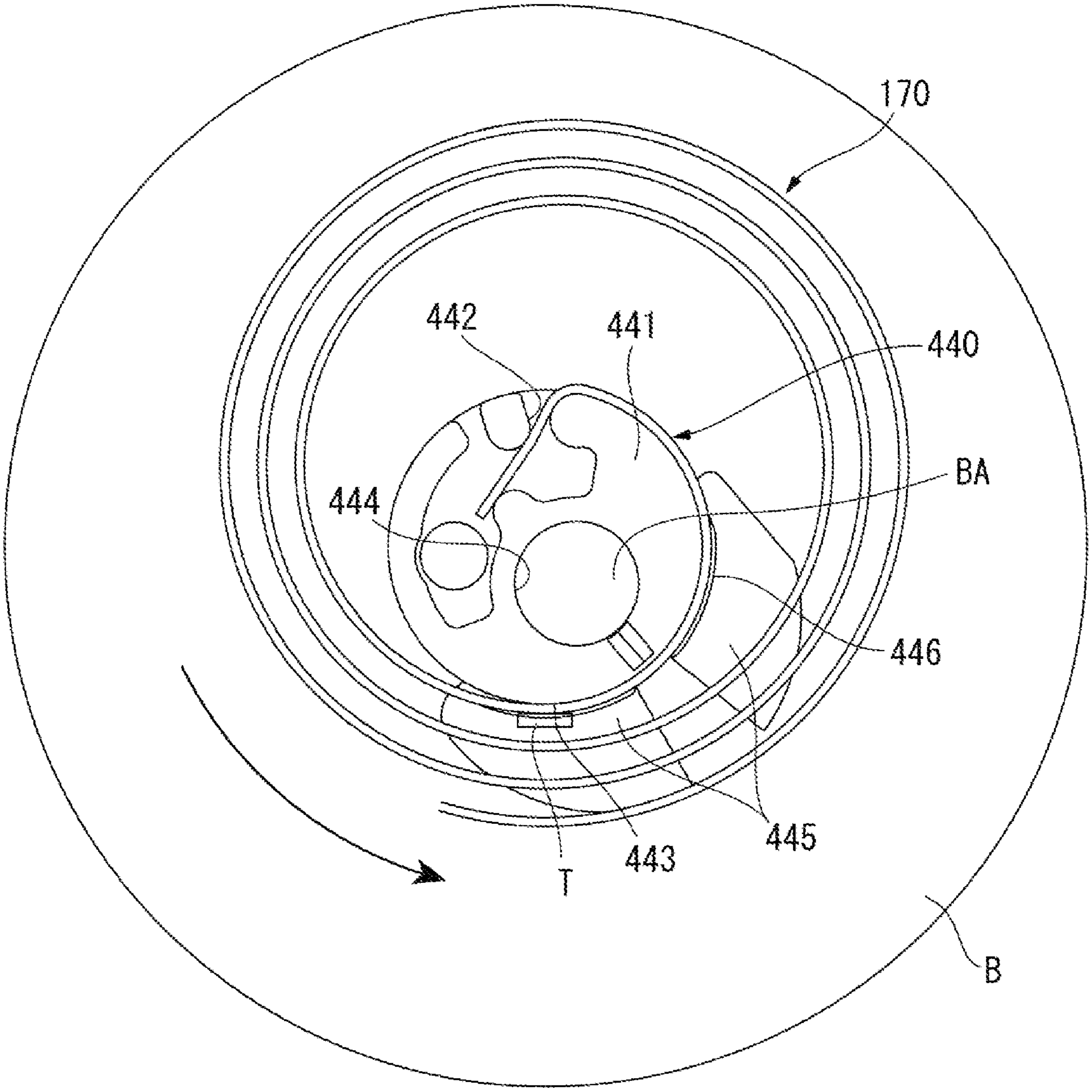
FIG. 8 is a front view illustrating the method for manufacturing the hairspring.
Figure 9:
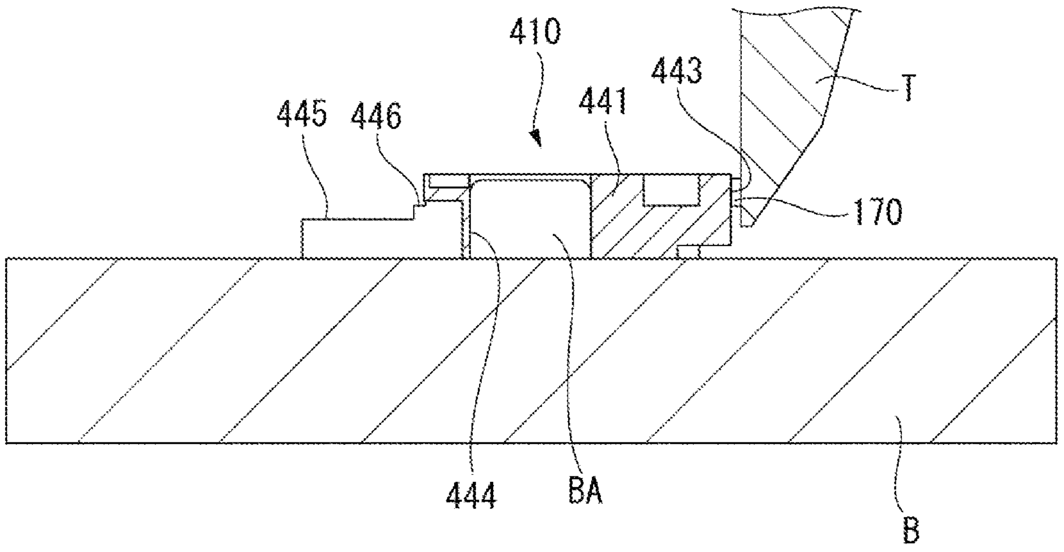
FIG. 9 is a cross-sectional view illustrating the method for manufacturing the hairspring.

Subsequently, as illustrated in FIG. 8, in a state in which the hairspring material 170 is sandwiched between the outer peripheral shape portion 443 and the shape forming unit T, the turntable B is rotated counterclockwise with the protrusion portion BA of the turntable B as the center of rotation. At this time, as illustrated in FIG. 9, the shape forming unit T is operated so as to press the hairspring material 170 against the outer peripheral shape portion 443 with a predetermined load. As a result, as illustrated in FIG. 8, the hairspring material 170 is wound along the outer peripheral shape portion 443. At this time, part of the hairspring material 170 is supported by the support portion 446 of the collet 440. Therefore, it is possible to prevent the hairspring material 170 from being wound around the outer peripheral shape portion 443 in a state that the hairspring material 170 deviates in the thickness direction of the collet main body 441.

Figure 10:
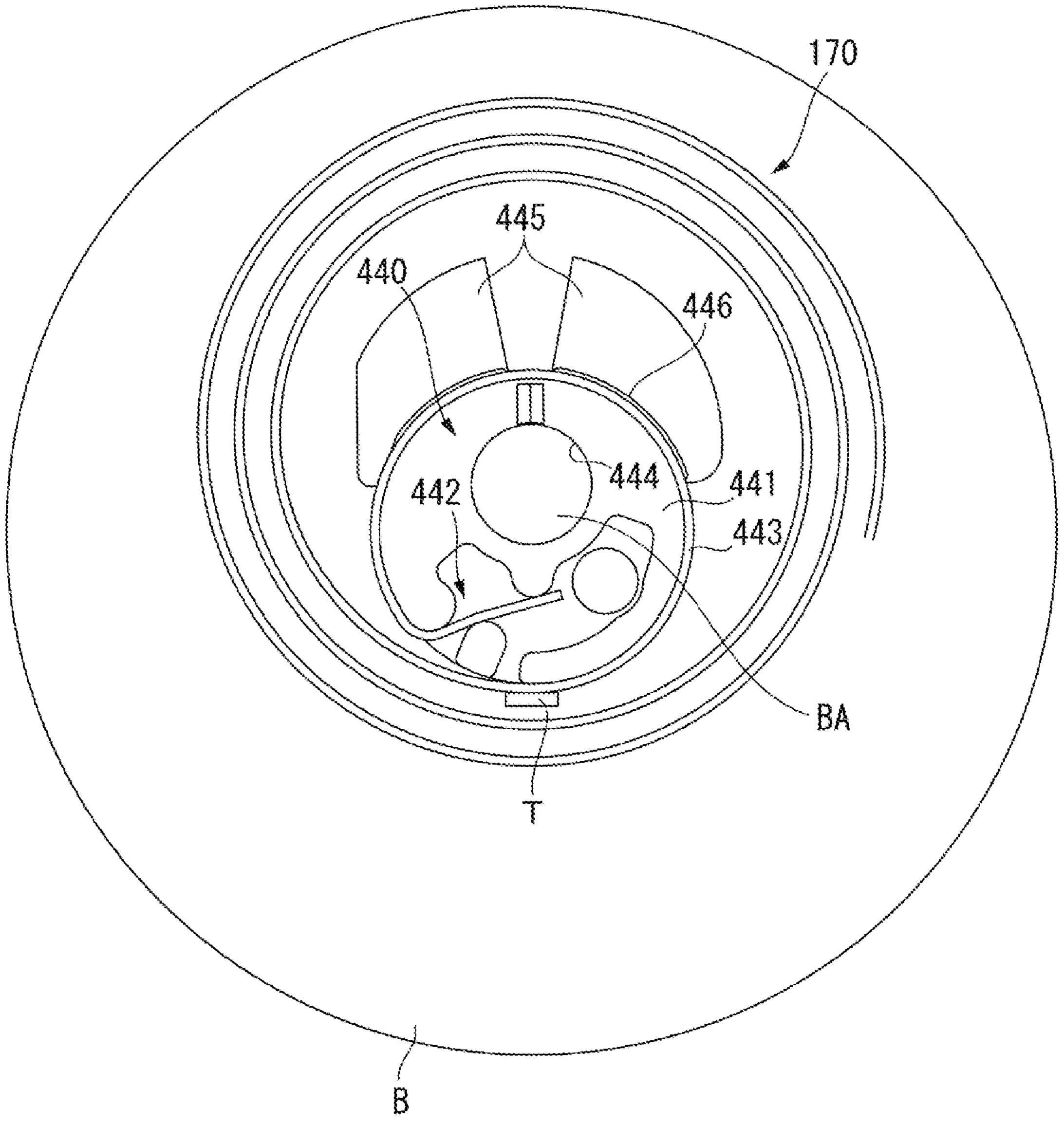
FIG. 10 is a front view illustrating the method for manufacturing the hairspring.

Then, as illustrated in FIG. 10, while rotating the turntable B at a predetermined rotational speed, a section from the inner end portion to a predetermined position of the hairspring material 170 is wound along the outer peripheral shape portion 443.

Note that in the exemplary embodiment, in plan view, the length of the section of the hairspring material 170 wound along the outer peripheral shape portion 443, that is, the length of the first winding portion 72 is configured to be shorter than the length of the outer peripheral shape portion 443.

Figure 11:
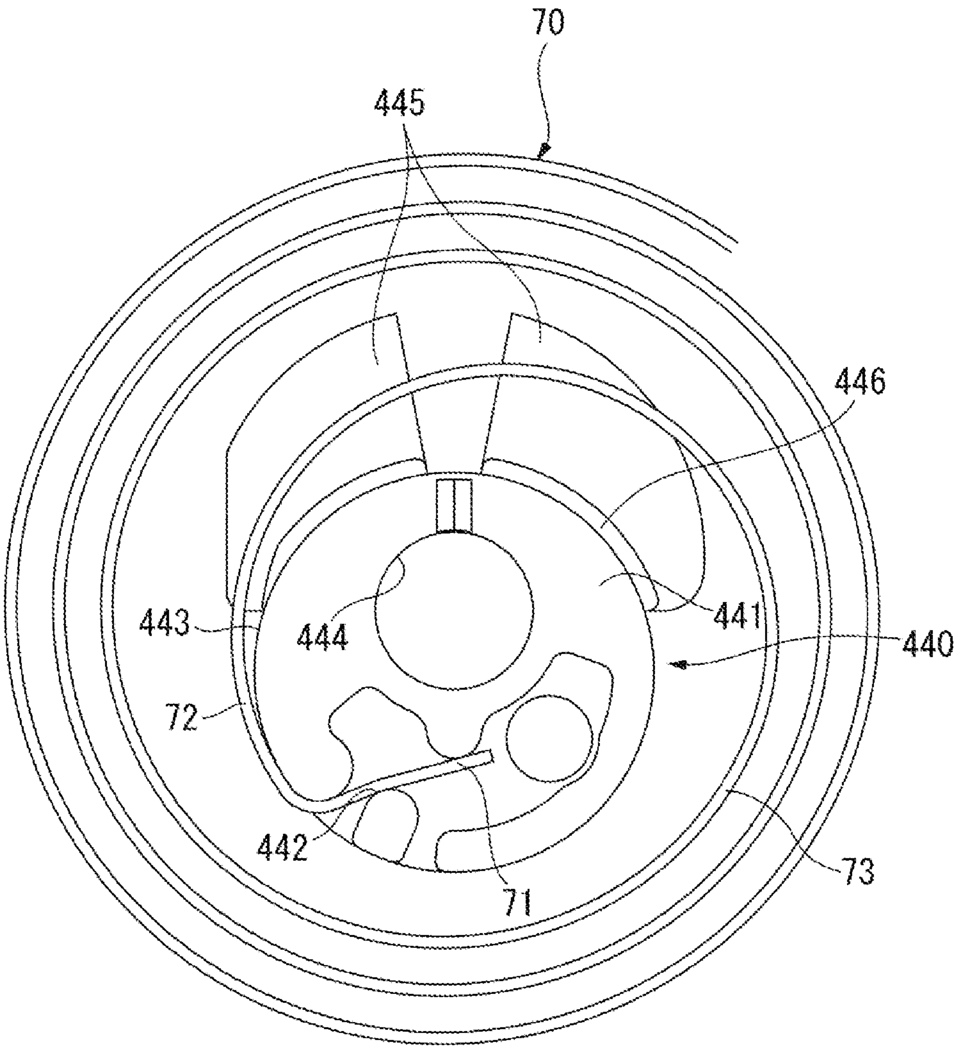
FIG. 11 is a front view illustrating the method for manufacturing the hairspring.

Thereafter, when the shape forming unit T is separated from the hairspring material 170 to remove the collet 440 from the turntable B, the hairspring 70 is completed to have the first winding portion 72 formed along the Grossmann curve and the second winding portion 73 formed along the Archimedes' spiral, as illustrated in FIG. 11. In other words, in the exemplary embodiment, in the manufacturing process of the hairspring 70, the outer peripheral shape portion 443 of the collet 440 is used to form the first winding portion 72 into the shape of Grossmann curve.

Note that the predetermined load for pressing the hairspring material 170 with the shape forming unit T has been confirmed in advance by trial or the like. In other words, the predetermined load is set so that the section from the inner end portion to the predetermined position of the hairspring material 170, which is wound along the outer peripheral shape portion 443, is formed into the shape of the Grossmann curve.

Thereafter, the collet 440 to which the hairspring 70 is fixed and the balance wheel 420 are fixed to the balance shaft 410 to complete the balance with hairspring 400.

Effect of Exemplary Embodiment

In such an exemplary embodiment, the following advantageous effects can be obtained.

In the exemplary embodiment, the collet 440 is arranged at the position facing the inner surface of the first winding portion 72 and has the outer peripheral shape portion 443 for forming the first winding portion 72 into the shape of the Grossmann curve.

With this configuration, the portion corresponding to the first winding portion 72 of the hairspring 70 can be wound along the outer peripheral shape portion 443 to form the first winding portion 72 into the Grossmann curve. Therefore, since the part of the hairspring 70 can be formed into the shape of the Grossmann curve without using LIGA technology or the like, it is possible to easily manufacture the metal hairspring 70 having excellent isochronism.

In the exemplary embodiment, the collet 440 includes the center of gravity adjustment portion 445 for adjusting the center of gravity of the collet 440 to the center position of the balance shaft 410.

With this configuration, even when the balance shaft insertion hole 444 of the collet 440 for inserting the balance shaft 410 is provided at the position eccentric to the center of the collet 440, the center of gravity of the collet 440 and the center of the balance shaft 410 can be aligned. Therefore, failures caused by deviation of the center of the balance shaft 410 from the center of gravity of the collet 440 can be suppressed.

In the exemplary embodiment, the outer peripheral shape portion 443 is configured as the outer peripheral surface of the collet main body 441 having the cylindrical shape. In other words, the outer peripheral shape portion 443 is formed in the arc shape in plan view seen from the axial direction of the balance shaft 410.

With this configuration, the outer peripheral shape portion 443 for forming the first winding portion 72 into the Grossmann curve can have a simple structure. Therefore, the collet 440 can be easily manufactured. Further, since the shape of the outer peripheral shape portion 443 can be formed with high accuracy, the variation in the shape of the first winding portion 72 can be reduced when the first winding portion 72 is formed using the outer peripheral shape portion 443.

In the exemplary embodiment, the length of the first winding portion 72 is configured to be shorter than the length of the outer peripheral shape portion 443 in plan view seen from the axial direction of the balance shaft 410.

With this configuration, the portion corresponding to the first winding portion 72 can be reliably wound around the outer peripheral shape portion 443, so that the variation in the shape of the first winding portion 72 can be reduced.

In the exemplary embodiment, the manufacturing process of the balance with hairspring 400 includes a step of forming the hairspring material 170 along the Archimedes' spiral, a step of fixing the inner end portion of the hairspring material 170 to the collet 440, and a step of forming the section from the inner end portion to the predetermined position of the hairspring material 170 into the shape of the Grossmann curve using the outer peripheral shape portion 443 of the collet 440.

Therefore, the predetermined section of the hairspring material 170 can be easily formed into the Grossmann curve.

Modification Example

Note that the present disclosure is not limited to the exemplary embodiment described above, and variations, modifications, and the like within the scope in which the object of the present disclosure can be achieved are included in the present disclosure.

In the exemplary embodiment, the fixing portion 442 is configured to include the first contact portion 4421, the second contact portion 4422, and the third contact portion 4423 that are in contact with the inner end portion 71 of the hairspring 70, but the present disclosure is not limited thereto. The fixing portion may be configured so that the inner end portion can be fixed. For example, the fixing portion may be configured as a groove that clamps the inner end portion of the hairspring, or may be configured so that the inner end portion is laser-welded to the fixing portion.

In the exemplary embodiment, the center of gravity adjustment portion 445 is integrally formed with the collet main body 441, but the present disclosure is not limited thereto. For example, the center of gravity adjustment portion may be provided as a member separate from the collet main body.

In the exemplary embodiment, the outer peripheral shape portion 443 is configured as the outer peripheral surface of the collet main body 441 having the cylindrical shape, but the present disclosure is not limited thereto. As for the outer peripheral shape portion 443, it is sufficient that the first winding portion be formed into the shape of the Grossmann curve.

Further, in a case in which a rate effect due to a change in the contact state at and near the connection point S becomes a problem when the hairspring 70 contracts in accordance with the rotational movement of the balance with hairspring 400, a partial relief shape may be provided at and near a portion of the outer peripheral shape portion 443 that faces the connection point S. For example, a relief shape that is not the arc but a straight line may be provided in the outer peripheral shape portion 443 in plan view from the axial direction of the balance shaft 410. In addition, the turntable B may be provided with a member having a shape for forming the shape of the Grossmann curve only at and near the connection point S.

In the exemplary embodiment, the thin wall portion 4411 is formed in the collet main body 441, but the present disclosure is not limited thereto. For example, a case in which no thin wall portion is formed in the collet main body is also included in the present disclosure. In this case, the balance shaft may be inserted into the balance shaft insertion hole of the collet matching the rotational phase of the impulse pin. Further, the thin wall portion may be provided in the collet main body 441 on the side where the first winding portion is not wound around the outer peripheral shape portion. Furthermore, instead of the thin wall portion, a slit extending from the balance shaft insertion hole toward the outer peripheral shape portion where the first winding portion is not wound may be provided, and when the collet is fitted to the balance shaft, the collet and the balance shaft may be fixed with a stable holding torque by the reaction force against the elastic deformation that opens the slit.

Summary of Disclosure

A balance with hairspring of the present disclosure includes a balance shaft rotatably supported by a support member, a collet fixed to the balance shaft, and a metal hairspring fixed to the collet, and the hairspring includes an inner end portion fixed to the collet, a first winding portion continuously formed from the inner end portion and formed along a Grossmann curve, and a second winding portion continuously formed from the first winding portion and formed along an Archimedes' spiral, and the collet includes a fixing portion to which the inner end portion of the hairspring is fixed, and an outer peripheral shape portion arranged at a position facing an inner surface of the first winding portion and configured to form the first winding portion into a shape of the Grossmann curve.

With this configuration, a portion corresponding to the first winding portion of the hairspring can be wound along the outer peripheral shape portion to form the shape of the first winding portion into the Grossmann curve. Therefore, since the part of the hairspring can be formed into the shape of the Grossmann curve without using LIGA technology or the like, it is possible to easily manufacture the metal hairspring having excellent isochronism.

In the balance with hairspring of the present disclosure, the collet may include a center of gravity adjustment portion configured to adjust a center of gravity of the collet to a center position of the balance shaft.

With this configuration, even when the balance shaft insertion hole of the collet for inserting the balance shaft is provided at a position eccentric to the center of the collet, the center of the gravity of the collet and the center of the balance shaft can be aligned. Therefore, failures caused by deviation of the center of the balance shaft from the center of gravity of the collet can be suppressed.

In the balance with hairspring of the present disclosure, the outer peripheral shape portion may be formed in an arc shape in plan view seen from an axial direction of the balance shaft.

With this configuration, the outer peripheral shape portion for forming the first winding portion into the Grossmann curve can have a simple structure. Therefore, the collet can be easily manufactured. Further, since the shape of the outer peripheral shape portion can be formed with high accuracy, the variation in the shape of the first winding portion can be reduced when the first winding portion is formed using the outer peripheral shape portion.

In the balance with hairspring of the present disclosure, a length of the first winding portion may be formed to be shorter than a length of the outer peripheral shape portion in plan view seen from an axial direction of the balance shaft.

With this configuration, the first winding portion of the hairspring can be reliably wound around the outer peripheral shape portion. Therefore, when the first winding portion is formed using the outer peripheral shape portion, the variation in the shape of the first winding portion can be reduced.

A movement of the present disclosure includes the balance with hairspring.

A mechanical watch of the present disclosure includes the movement.

A method for manufacturing a balance with hairspring of the present disclosure is a method for manufacturing the balance with hairspring including a balance shaft rotatably supported by a support member, a collet fixed to the balance shaft, and a metal hairspring having an inner end portion fixed to the collet, and the method includes forming the hairspring along an Archimedes' spiral, fixing the inner end portion of the hairspring to the collet, and forming a section from the inner end portion to a predetermined position of the hairspring into a shape of a Grossmann curve using the outer peripheral shape portion of the collet.

With this method, the predetermined section of the hairspring can be easily formed into the Grossmann curve.

What is claimed is:

1. A balance with a hairspring comprising:
a balance shaft rotatably supported by a support member;
a collet fixed to the balance shaft; and
a metal hairspring fixed to the collet, wherein
the hairspring includes
an inner end portion fixed to the collet,
a first winding portion continuously formed from the inner end portion and formed along a Grossmann curve, and
a second winding portion continuously formed from the first winding portion and formed along an Archimedes' spiral, and
the collet includes
a fixing portion to which the inner end portion of the hairspring is fixed, and
an outer peripheral shape portion arranged at a position facing an inner surface of the first winding portion and configured to form the first winding portion into a shape of the Grossmann curve.

2. The balance with a hairspring according to claim 1, wherein
the collet includes a center of gravity adjustment portion configured to adjust a center of gravity of the collet to a center position of the balance shaft.

3. The balance with a hairspring according to claim 1, wherein
the outer peripheral shape portion is formed in an arc shape in plan view seen from an axial direction of the balance shaft.

4. The balance with a hairspring according to claim 1, wherein
a length of the first winding portion is formed to be shorter than a length of the outer peripheral shape portion in plan view seen from an axial direction of the balance shaft.

5. A movement comprising the balance with hairspring according to claim 1.

6. A mechanical watch comprising the movement according to claim 5.

7. A method for manufacturing a balance with hairspring including a balance shaft rotatably supported by a support member, a collet fixed to the balance shaft, and a metal hairspring having an inner end portion fixed to the collet, the method comprising:

forming the hairspring along an Archimedes' spiral;

fixing the inner end portion of the hairspring to the collet; and forming a section from the inner end portion to a predetermined position of the hairspring into a Grossmann curve using an outer peripheral shape portion of the collet.

* * * * *